(12) United States Patent  
Yajima et al.

(10) Patent No.: US 12,365,304 B2  
(45) Date of Patent: Jul. 22, 2025

(54) IGNITER AND GAS GENERATOR (71) Applicant: NIPPON KAYAKU KABUSHIKI KAISHA, Tokyo (JP)

(72) Inventors: Itsuki Yajima, Tokyo (JP); Tomohiro Hakozaki, Tokyo (JP); Tomoyuki Nakano, Tokyo (JP)

( * ) Notice: Subject to any disclaimer, the term of this patent is extended or adjusted under 35 U.S.C. 154(b) by 141 days.

(21) Appl. No.: 18/548,908

(22) PCT Filed: Feb. 23, 2022

(86) PCT No.: PCT/JP2022/007435  
§ 371 (c)(1),  
(2) Date: Sep. 4, 2023

(87) PCT Pub. No.: WO2022/186018  
PCT Pub. Date: Sep. 9, 2022

(65) Prior Publication Data  
US 2024/0140351 A1 May 2, 2024

(30) Foreign Application Priority Data  
Mar. 2, 2021 (JP) ................................ 2021-032490

(51) Int. Cl.  
*B60R 21/264* (2006.01)  
*F42B 3/10* (2006.01)

(52) U.S. Cl.  
CPC .............. *B60R 21/264* (2013.01); *F42B 3/10* (2013.01)

(58) Field of Classification Search  
CPC . F42B 3/10; F42B 3/04; B60R 21/264; B60R 2021/26035  
See application file for complete search history.

(56) References Cited

U.S. PATENT DOCUMENTS 3,745,927 A * 7/1973 Tanner ................ F02K 9/34  
                                                                           86/23  
5,942,717 A * 8/1999 Pathe ................ F42B 3/124  
                                                                      102/202.7

(Continued)

FOREIGN PATENT DOCUMENTS

JP        10310023 A    11/1998  
JP     2003182506 A     7/2003

(Continued)

OTHER PUBLICATIONS

ISR; Japan Patent Office; Tokyo; May 10, 2022.  
European Search Report; Berlin; Jan. 3, 2025.

*Primary Examiner* — Joshua E Freeman  
(74) *Attorney, Agent, or Firm* — Patshegen IP; Moshe Pinchas (57) ABSTRACT

Provided are an igniter and a gas generator that suppress inhibition of fire transfer to an enhance agent by adjusting elongation of a cup-shaped member at the time of activation while maintaining sealability and insulation. A disk-type gas generator 100 has a short substantially cylindrical housing in which one end and the other end in an axial direction are closed, and a holder 30, an igniter 40 including a squib cover 43, a cup-shaped member 50, an enhance agent 59, a gas generating agent 61, a lower support member 70, an upper support member 80, a cushion material 85, a filter 90, and the like as internal components are accommodated in an accommodation space provided inside the housing. The squib cover 43 is formed by molding a thermosetting resin or a thermoplastic resin containing an elongation percentage adjusting material into a cup shape in order to set an elongation percentage at the time of activation of the igniter 40 to be greater than 0% and less than 10%.

3 Claims, 6 Drawing Sheets

(56) References Cited

U.S. PATENT DOCUMENTS

| | | | | |
|---|---|---|---|---|
| 6,474,684 B1* | 11/2002 | Ludwig | C06D 5/06 | |
| | | | 280/736 | |
| 6,553,914 B2* | 4/2003 | Hosey | B60R 22/4628 | |
| | | | 280/741 | |
| 9,010,803 B2* | 4/2015 | Smith | B60R 21/264 | |
| | | | 280/741 | |
| 2007/0228703 A1* | 10/2007 | Breed | B60R 21/232 | |
| | | | 280/740 | |
| 2009/0260730 A1 | 10/2009 | Kodama | | |
| 2010/0242779 A1* | 9/2010 | Katsuda | F42B 3/103 | |
| | | | 102/202.14 | |
| 2011/0253000 A1* | 10/2011 | Kobayashi | B60R 21/2644 | |
| | | | 102/531 | |
| 2013/0276662 A1* | 10/2013 | Ohsugi | C06D 5/00 | |
| | | | 102/530 | |
| 2013/0291756 A1* | 11/2013 | Ohsugi | B01J 7/00 | |
| | | | 102/530 | |
| 2016/0052486 A1* | 2/2016 | Ohsugi | B60R 21/264 | |
| | | | 102/530 | |
| 2017/0043742 A1* | 2/2017 | Ueda | B60R 21/264 | |
| 2017/0166160 A1* | 6/2017 | Izuma | B60R 21/2644 | |
| 2018/0312132 A1* | 11/2018 | Ohsugi | B60R 21/2644 | |
| 2019/0054891 A1* | 2/2019 | Tanaka | F42B 3/103 | |
| 2019/0201829 A1* | 7/2019 | Yamaguchi | B01D 46/528 | |
| 2020/0139925 A1* | 5/2020 | Koyama | B60R 21/264 | |
| 2020/0180548 A1* | 6/2020 | Ueda | B60R 21/2644 | |
| 2024/0294138 A1* | 9/2024 | Fukushima | F42B 3/125 | |
| 2024/0318943 A1* | 9/2024 | Fukushima | B60R 21/2644 | |

FOREIGN PATENT DOCUMENTS

| | | |
|---|---|---|
| JP | 200567570 A | 3/2005 |
| JP | 2019519431 A | 7/2019 |
| JP | 2021 037891 A | 3/2021 |
| JP | 202137891 A | 3/2021 |

* cited by examiner

IGNITER AND GAS GENERATOR

TECHNICAL FIELD

The present invention relates to an igniter and a gas generator incorporated in an occupant protector that protects an occupant in an event of collision of a vehicle or the like, and particularly to a gas generator incorporated in an airbag device mounted on an automobile or the like.

BACKGROUND ART

Conventionally, an airbag device which is an occupant protector has been widely used from the viewpoint of protecting an occupant of an automobile or the like. The airbag device is provided for the purpose of protecting an occupant from an impact generated at a time of collision of a vehicle or the like, and instantly inflates and deploys an airbag at the time of collision of the vehicle or the like, and thus the airbag serves as a cushion to receive the body of the occupant.

A gas generator is a device that is incorporated in the airbag device, ignites an igniter by energization from a control unit at the time of collision of the vehicle or the like, causes a gas generating agent to combust by flame generated in the igniter to instantaneously generate a large amount of gas, and inflates and deploys the airbag.

There are gas generators having various structures. As a gas generator that can be particularly suitably used for a driver seat side airbag device, a passenger seat side airbag device, and the like, there is a short substantially cylindrical disk-type gas generator having a relatively large outer diameter.

The disk-type gas generator has a short substantially cylindrical housing in which both ends in an axial direction are closed, a plurality of gas ejection ports is provided in a circumferential wall portion of the housing, an enhance agent is accommodated in the housing so as to face an igniter assembled to the housing, a gas generating agent is filled in the housing so as to surround the enhance agent, and a filter is accommodated in the housing so as to further surround a periphery of the gas generating agent.

For example, Patent Literature 1 discloses a specific configuration of the disk-type gas generator.

In particular, FIG. 4 of Patent Literature 1 below discloses a configuration in which a cup-shaped member is disposed on an outer peripheral surface of an igniter, and the cup-shaped member is pressed with an O-ring interposed therebetween to seal between the igniter and a hole.

CITATION LIST

Patent Literature

Patent Literature 1: JP H10-310023 A

SUMMARY OF INVENTION

Technical Problems

In the above-described cup-shaped member, it is desirable that the fire transfer from the igniter to the enhance agent is not hindered while maintaining sealability and insulation as described above. Then, the gas generating agent in the gas generator can efficiently combust in a short time, and gas can be ejected to the airbag. However, in the above-described cup-shaped member, it has been found by a study of the inventor(s) of the present application that the cup-shaped member expands to some extent following a breakage of another cup-shaped member internally including an ignition agent (gun powder) of the igniter and then breaks when the igniter is activated, but when the elongation is large, the fire transfer from the igniter to the enhance agent is hindered.

The present invention has been made to solve the above problems, and an object of the present invention is to provide an igniter and a gas generator that suppress inhibition of fire transfer to an enhance agent more than the related art by adjusting elongation of a cup-shaped member at the time of activation while maintaining sealability and insulation.

Solutions to Problems (1) An igniter of the present invention includes a first cup-shaped member that has a bottomed cylindrical shape, internally includes an ignition charge, and has an opening fitted by a plug having a pair of electrode pins to which a resistor is connected, a second cup-shaped member that has a bottomed cylindrical shape and covers an outside of the first cup-shaped member, and a holder that integrally holds the pair of electrode pins, the plug, the first cup-shaped member, and the second cup-shaped member, in which the second cup-shaped member includes a thermosetting resin or a thermoplastic resin including an elongation percentage adjusting material that adjusts an elongation percentage after molding to less than 10%.

(2) In the igniter (1), the second cup-shaped member and the holder are preferably integrally molded, and the holder preferably includes the same material as the second cup-shaped member.

(3) The present invention is a gas generator including the igniter according to (1) or (2).

Advantageous Effects of Invention

The present invention can provide an igniter and a gas generator that suppress inhibition of fire transfer to an enhance agent by adjusting elongation of a cup-shaped member at the time of activation while maintaining sealability and insulation.

DESCRIPTION OF EMBODIMENT

Hereinafter, an embodiment of the present invention will be described with reference to the drawings. In the following embodiment, the present invention is applied to a disk-type gas generator suitably incorporated in an airbag device mounted on a steering wheel or the like of an automobile. In the following embodiment, the same or common parts are denoted by the same reference signs in the drawings, and the description thereof will not be repeated.

Figure 1:
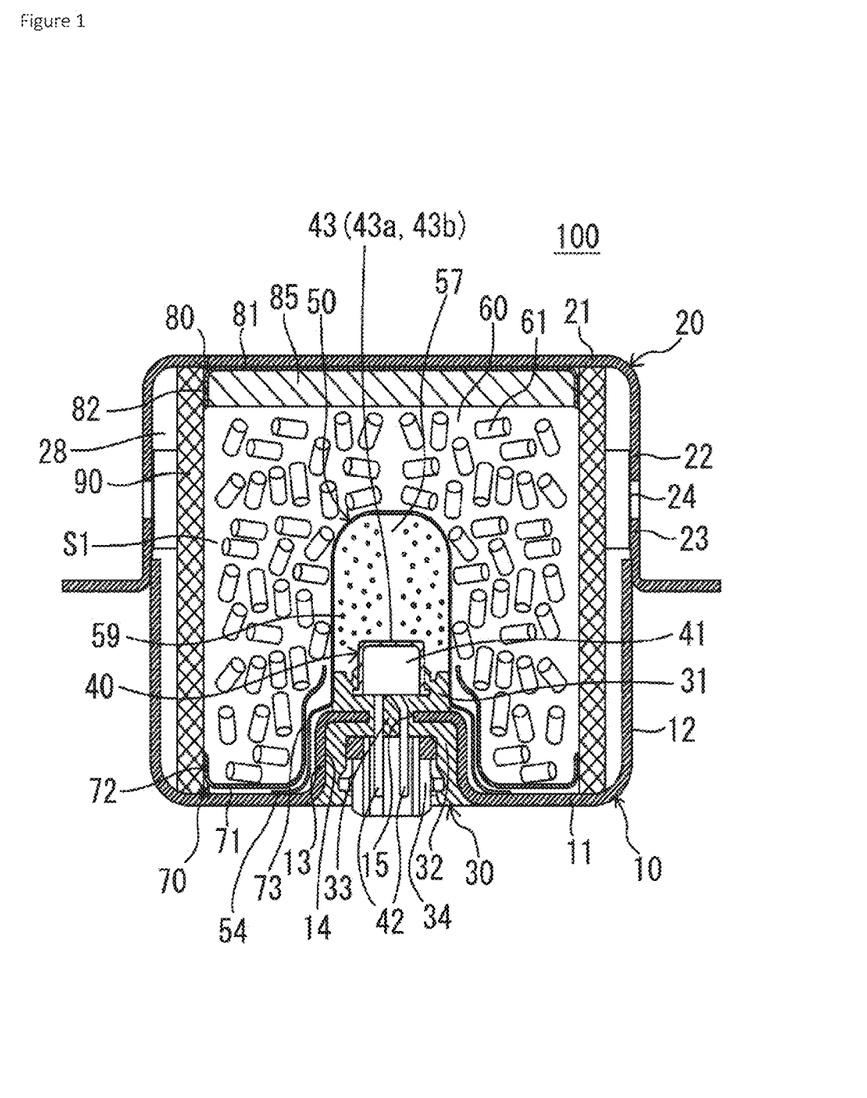
FIG. 1 is a schematic sectional view of a disk-type gas generator according to an embodiment of the present invention.

FIG. 1 is a schematic sectional view of a disk-type gas generator 100 according to the embodiment of the present invention. First, a configuration of the disk-type gas generator 100 according to the present embodiment will be described with reference to FIG. 1.

As shown in FIG. 1, the disk-type gas generator 100 has a short substantially cylindrical housing in which one end and the other end in an axial direction are closed, and a holder 30, an igniter 40, a cup-shaped member 50, an enhance agent 59, a gas generating agent 61, a lower support member 70, an upper support member 80, a cushion material 85, a filter 90, and the like as internal components are accommodated in an accommodation space provided inside the housing. In addition, a combustion chamber 60 in which the gas generating agent 61 among the above-described internal components is mainly accommodated is located in the accommodation space provided inside the housing.

The housing includes a lower shell 10 and an upper shell 20. Each of the lower shell 10 and the upper shell 20 includes, for example, a press-molded product formed by pressing a rolled metal plate member. As the metal plate member constituting the lower shell 10 and the upper shell 20, for example, a metal plate including stainless steel, steel, aluminum alloy, stainless alloy, or the like is used, and preferably, a so-called high-tensile steel plate in which damage such as breakage does not occur even when a tensile stress of 440 [MPa] or more and 780 [MPa] or less is applied is used.

Each of the lower shell 10 and the upper shell 20 has a bottomed substantially cylindrical shape, and opening surfaces of the shells are combined and joined so as to face each other to constitute the housing. The lower shell 10 has a bottom plate portion 11 and a circumferential wall portion 12, and the upper shell 20 has a top plate portion 21 and a circumferential wall portion 22.

An upper end of the circumferential wall portion 12 of the lower shell 10 is press-fitted by being inserted into a lower end of the circumferential wall portion 22 of the upper shell 20. Furthermore, the circumferential wall portion 12 of the lower shell 10 and the circumferential wall portion 22 of the upper shell 20 are joined at or near an abutment portion, and thus the lower shell 10 and the upper shell 20 are fixed. Here, electron beam welding, laser welding, friction welding, or the like can be suitably used for joining the lower shell 10 and the upper shell 20.

Thus, a part of the circumferential wall portion of the housing closer to the bottom plate portion 11 is configured by the circumferential wall portion 12 of the lower shell 10, and a part of the circumferential wall portion of the housing closer to the top plate portion 21 is configured by the circumferential wall portion 22 of the upper shell 20. One end and the other end of the housing in the axial direction are closed by the bottom plate portion 11 of the lower shell 10 and the top plate portion 21 of the upper shell 20, respectively.

A protruding cylindrical portion 13 protruding toward the top plate portion 21 is provided at a center of the bottom plate portion 11 of the lower shell 10, and thus a recess 14 is formed at the center of the bottom plate portion 11 of the lower shell 10. The protruding cylindrical portion 13 is a portion to which the igniter 40 is fixed with the holder 30 interposed therebetween, and the recess 14 is a portion serving as a space for providing a female connector 34 in the holder 30.

The protruding cylindrical portion 13 has a bottomed substantially cylindrical shape, and an opening 15 having a point-asymmetrical shape (for example, a D shape, a barrel shape, an oval shape, or the like) in plan view is provided at an axial end located close to the top plate portion 21. The opening 15 is a portion through which a pair of terminal pins 42 of the igniter 40 is inserted.

Figure 2:
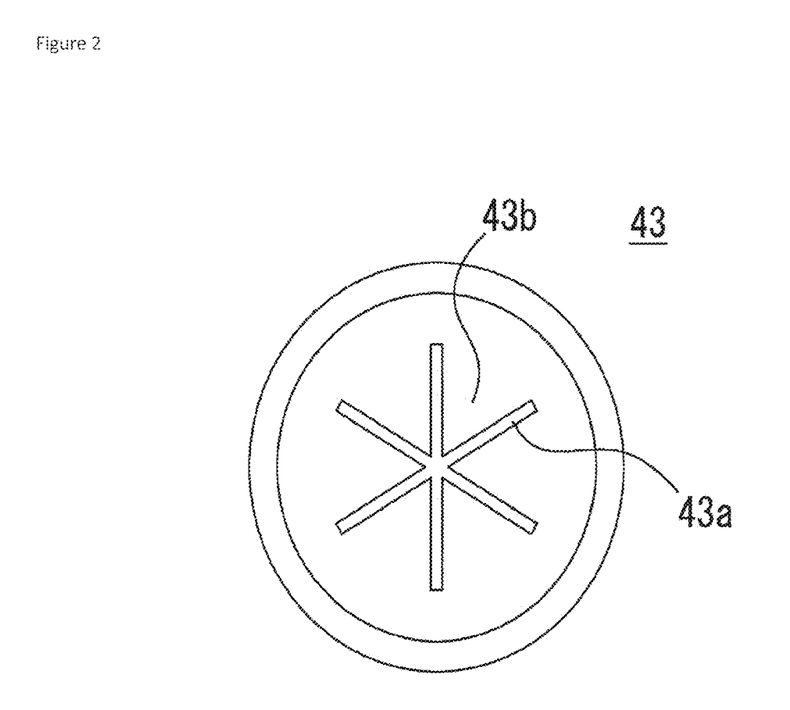
FIG. 2 is a top view of a squib cover of the disk-type gas generator of FIG. 1.

The igniter 40 is for generating flame, and includes an ignition portion 41, the pair of terminal pins 42 described above, and a squib cover 43 (second cup-shaped member). The ignition portion 41 internally includes ignition charge that ignites and combusts at the time of activation to generate flame, and a resistor for igniting the ignition charge. The pair of terminal pins 42 is connected to the ignition portion 41 in order to ignite the ignition charge. The squib cover 43 is provided for sealing and insulating the igniter 40, and as shown in FIG. 2, a slit-shaped weak member 43a and a non-weak member 43b between slits of the weak member 43a are provided at a top of the squib cover 43. The weak member 43a is more likely to be cleaved or melted when the igniter 40 is in activation than the non-weak member 43b.

Note that the squib cover 43 is formed by molding a thermosetting resin or a thermoplastic resin containing an elongation percentage adjusting material into a cup shape in order to adjust an elongation percentage at the time of activation of the igniter 40 to be greater than 0% and less than 10% (preferably greater than 0% and less than 5%, more preferably greater than 0% and less than 3%). The elongation percentage is determined by performing a test according to a method specified in JIS K7161-2 (2014) and calculating the elongation percentage by the following calculation formula.

Elongation percentage[%]=(maximum length of test piece before breakage−length of test piece in initial state)×100/length of test piece in initial state Here, examples of the thermosetting resin include a phenol resin, a urea resin, a melamine resin, an unsaturated polyester resin, an epoxy resin, and a polyimide resin. Examples of the thermoplastic resin include polypropylene, polymethyl methacrylate, polystyrene resin, ABS resin, vinyl chloride, nylon 6, nylon 66, polyamideimide, polyetherimide, polycarbonate, polyacetal, polyphenylene oxide, and polyphenylene sulfide. Examples of the elongation percentage adjusting material include graphite cast iron articles (FCV), cast iron such as aluminum die casting, and ceramics such as alumina, glass, silicon carbide, and silicon nitride, and any material may be used as long as the material can change the elongation percentage of the thermosetting resin or the thermoplastic resin.

The ignition portion 41 includes a squib cup (first cup-shaped member) having a cup shape, and a plug that closes an opening end of the scribe cup and through which the pair of terminal pins 42 is inserted to hold the squib cup. The ignition portion 41 has a configuration in which the resistor (bridge wire) is attached so as to couple tips of the pair of terminal pins 42 inserted into the squib cup, and the ignition charge is loaded in the squib cup so as to surround the resistor or to be close to the resistor.

Here, a nichrome wire or the like is generally used as the resistor, and zirconium-potassium-perchlorate (ZPP), zirconium-tungsten-potassium perchlorate (ZWPP), lead tricinate, or the like is generally used as the ignition charge. Note that the squib cup and the plug described above generally include metal or plastic.

When a collision is detected, a predetermined amount of current flows through the resistor through the terminal pins 42. When a predetermined amount of current flows through the resistor, Joule heat is generated in the resistor, and the ignition charge starts combustion. The high-temperature flame generated by the combustion causes the squib cup storing the ignition charge to rupture. Time until the igniter 40 starts activation after the current flowing through the resistor is generally 2 [ms] or less when a nichrome wire is used for the resistor.

The igniter 40 is attached to the bottom plate portion 11 in a state of being inserted from inside of the lower shell 10 such that the terminal pins 42 are inserted into the opening 15 provided in the protruding cylindrical portion 13. Specifically, the holder 30 including a resin molding portion is provided on an inner periphery of the protruding cylindrical portion 13 provided on the bottom plate portion 11, and the igniter 40 is fixed to the bottom plate portion 11 by being held by the holder 30.

The holder 30 is formed by injection molding (specifically, insert molding) using a mold, and is formed by attaching an insulating flowable resin material to the bottom plate portion 11 so as to reach from a part of an inner surface to a part of an outer surface of the bottom plate portion 11 through the opening 15 provided in the bottom plate portion 11 of the lower shell 10 and solidifying the material.

As a raw material of the holder 30 formed by injection molding, a resin material excellent in heat resistance, durability, corrosion resistance, and the like after curing is suitably selected and used. In that case, the thermoplastic resin is not limited to a thermosetting resin typified by an epoxy resin or the like, and a thermoplastic resin typified by a polybutylene terephthalate resin, a polyethylene terephthalate resin, a polyamide resin (for example, nylon 6, nylon 66, or the like), a polypropylene sulfide resin, a polypropylene oxide resin, or the like can also be used. When the above thermoplastic resins are selected as raw material, it is preferable to contain glass fibers or the like as a filler in these resin materials in order to secure a mechanical strength of the holder 30 after molding. However, when sufficient mechanical strength can be secured only by a thermoplastic resin, it is not necessary to add a filler as described above.

The holder 30 includes an inner cover 31 that covers a part of the inner surface of the bottom plate portion 11 of the lower shell 10, an outer cover 32 that covers a part of the outer surface of the bottom plate portion 11 of the lower shell 10, and a coupling portion 33 that is located in the opening 15 provided in the bottom plate portion 11 of the lower shell 10 and is continuous with each of the inner cover 31 and the outer cover 32.

The holder 30 is fixed to the bottom plate portion 11 on a surface of each of the inner cover 31, the outer cover 32, and the coupling portion 33 close to the bottom plate portion 11. The holder 30 is fixed to a side surface and a lower surface of a part near a lower end of the ignition portion 41 of the igniter 40 and a surface of a part near upper ends of the terminal pins 42 of the igniter 40.

As a result, the opening 15 is completely embedded by the terminal pins 42 and the holder 30, sealability at the part is secured, and thus airtightness of the space inside the housing is secured. Since the opening 15 has a point-asymmetric shape in plan view (not shown), by embedding the opening 15 with the coupling portion 33, the opening 15 and the coupling portion 33 also function as a whirl-stop mechanism that prevents the holder 30 from rotating with respect to the bottom plate portion 11.

The female connector 34 is formed at a part of the holder 30 facing outside of the outer cover 32. The female connector 34 is a portion for receiving a male connector (not shown) of a harness for connecting the igniter 40 and a control unit (not shown), and is located in the recess 14 provided in the bottom plate portion 11 of the lower shell 10.

In the female connector 34, a portion close to lower ends of the terminal pins 42 of the igniter 40 is disposed to be exposed. The male connector is inserted into the female connector 34 to achieve electrical conduction between a core wire of the harness and the terminal pins 42.

The injection molding described above may be performed by using the lower shell 10 in which an adhesive layer is provided in advance at a predetermined position on the surface of the bottom plate portion 11 of the portion to be covered by the holder 30. The adhesive layer can be formed by applying an adhesive in advance to a predetermined position of the bottom plate portion 11 and curing the adhesive.

In this way, since the cured adhesive layer is located between the bottom plate portion 11 and the holder 30, the holder 30 including the resin molding portion can be more firmly fixed to the bottom plate portion 11. Therefore, if the adhesive layer is annularly provided along a circumferential direction so as to surround the opening 15 provided in the bottom plate portion 11, higher sealability can be secured at the part.

Here, as an adhesive applied to the bottom plate portion 11 in advance, an adhesive containing a resin material excellent in heat resistance, durability, corrosion resistance, and the like after curing as a raw material is suitably used, and for example, an adhesive containing a cyanoacrylate resin or a silicone resin as a raw material is particularly suitably used. In addition to the above resin material, a material containing, as a raw material, a phenolic resin, an epoxy resin, a melamine resin, a urea resin, a polyester resin, an alkyd resin, a polyurethane resin, a polyimide resin, a polyethylene resin, a polypropylene resin, a polyvinyl chloride resin, a polystyrene resin, a polyvinyl acetate resin, a polytetrafluoroethylene resin, an acrylonitrile butadiene styrene resin, an acrylonitrile styrene resin, an acrylic resin, a polyamide resin, a polyacetal resin, a polycarbonate resin, a polyphenylene ether resin, a polybutylene terephthalate resin, a polyethylene terephthalate resin, a polyolefin resin, a polyphenylene sulfide resin, a polysulfone resin, a polyether sulfone resin, a polyarylate resin, a polyether ether ketone resin, a polyamide imide resin, a liquid crystal polymer, a styrene rubber, an olefin rubber, or the like can be used as the adhesive described above.

Note that, here, a configuration example has been exemplified in which the igniter 40 can be fixed to the lower shell 10 by injection-molding the holder 30 including the resin molding portion. However, other alternative means can be used for fixing the igniter 40 to the lower shell 10.

The cup-shaped member 50 is assembled to the bottom plate portion 11 so as to cover the protruding cylindrical portion 13, the holder 30, and the igniter 40.

The cup-shaped member 50 is provided to cover the holder 30 and the igniter 40. The cup-shaped member 50 has a substantially cylindrical shape in which an end close to the bottom plate portion 11 is opened, and includes an enhancer chamber 57 that internally accommodates the enhance agent 59. The cup-shaped member 50 is disposed in the combustion chamber 60 such that the enhancer chamber 57 faces the squib cover 43 and the ignition portion 41. The cup-shaped member 50 has a distal end 54 extending in a flange shape at an opening end, and the distal end 54 is fixed in a state of being sandwiched between the bottom plate portion 11 and the lower support member 70. The cup-shaped member 50 ruptures, deforms, or melts with an increase in pressure in the space inside the cup-shaped member 50 or conduction of generated heat when the enhance agent 59 inside the enhancer chamber is ignited by the activation of the igniter 40.

As a material of the cup-shaped member 50, a member including metal such as stainless steel, steel, aluminum, an aluminum alloy, stainless steel, or a stainless alloy, or a member including resin such as thermosetting resin typified by epoxy resin or the like, polybutylene terephthalate resin, polyethylene terephthalate resin, polyamide resin (for example, nylon 6, nylon 66, or the like), polypropylene sulfide resin, or thermoplastic resin typified by polypropylene oxide resin is suitably used. In particular, an aluminum alloy or an iron-based metal material such as stainless steel or steel having a mechanical strength relatively higher than a mechanical strength of aluminum is preferable.

A method of fixing the cup-shaped member 50 is not limited to a fixing method using the lower support member 70 described above, and other fixing methods may be used.

The enhance agent 59 filled in the enhancer chamber is ignited by flame generated by the activation of the igniter 40, and generates heat particles by combustion. As the enhance agent 59, it is necessary to be able to reliably start combustion of the gas generating agent 61, and in general, a composition including metal powder/oxidizer typified by $B/KNO_3$, $B/NaNO_3$, $Sr(NO_3)_2$, or the like, a composition including titanium hydride/potassium perchlorate, a composition including B/5-aminotetrazole/potassium nitrate/molybdenum trioxide, or the like is used.

The enhance agent 59 is used in a form of powder or a form molded into a predetermined shape by a binder. Examples of the shape of the enhance agent 59 formed by the binder include various shapes such as a granular shape, a columnar shape, a sheet shape, a spherical shape, a single-hole cylindrical shape, a porous cylindrical shape, and a tablet shape.

In a space surrounding the part where the cup-shaped member 50 is disposed in the space inside the housing, the combustion chamber 60 accommodating the gas generating agent 61 is located. Specifically, as described above, the cup-shaped member 50 is disposed so as to protrude into the combustion chamber 60 formed inside the housing. A space provided in the part facing an outer surface of the top wall of the cup-shaped member 50 and a space provided in the part facing an outer surface of the side wall are configured as the combustion chamber 60. As a result, the gas generating agent 61 is disposed adjacent to an outer surface of the cup-shaped member 50.

In a space surrounding the combustion chamber 60 accommodating the gas generating agent 61 in a radial direction of the housing, the filter 90 is disposed along an inner periphery of the housing. The filter 90 has a cylindrical shape and is disposed so as to have a central axis of the filter 90 substantially coincides with the axial direction of the housing.

The gas generating agent 61 is an agent that is ignited by heat particles generated by the activation of the igniter 40 and generates a gas by combustion. As the gas generating agent 61, a non-azide gas generating agent is preferably used, and the gas generating agent 61 is generally formed as a molded body containing a fuel, an oxidizer, and an additive.

As the fuel, for example, a triazole derivative, a tetrazole derivative, a guanidine derivative, an azodicarbonamide derivative, a hydrazine derivative, or the like, or a combination thereof is used. Specifically, for example, nitroguanidine, guanidine nitrate, cyanoguanidine, 5-aminotetrazole, or the like is suitably used.

Examples of the oxidizer include basic metal hydroxides such as basic copper nitrate and basic copper carbonate, perchlorates such as ammonium perchlorate and potassium perchlorate, and nitrates containing cations selected from alkali metals, alkaline earth metals, transition metals, and ammonia. As the nitrate, for example, sodium nitrate, potassium nitrate or the like is suitably used.

Examples of the additive include a binder, a slag forming agent, and a combustion adjusting agent. As the binder, for example, an organic binder such as polyvinyl alcohol, a metal salt of carboxymethyl cellulose, or a stearate, or an inorganic binder such as synthetic hydrotalcite or acidic clay can be suitably used. In addition, as the binder, polysaccharide derivatives such as hydroxyethyl cellulose, hydroxypropyl methyl cellulose, cellulose acetate, cellulose propionate, cellulose acetate butyrate, nitrocellulose, microcrystalline cellulose, guar gum, polyvinyl pyrrolidone, polyacrylamide, and starch, and inorganic binders such as molybdenum disulfide, talc, bentonite, diatomaceous earth, kaolin, and alumina can also be suitably used. As the slag forming agent, silicon nitride, silica, acid clay, and the like can be suitably used. As the combustion adjusting agent, metal oxide, ferrosilicon, activated carbon, graphite, and the like can be suitably used.

The shape of the molded body of the gas generating agent 61 includes various shapes such as a granular shape, a pellet shape, a cylindrical granular shape, and a disk shape. In addition, as the cylindrical molded body, a porous (for example, a single-hole cylindrical shape, a porous cylindrical shape, or the like) molded body having a through hole in the molded body is also used. These shapes are preferably appropriately selected in accordance with the specifications of an airbag device in which the disk-type gas generator 100 is incorporated, and it is preferable to select an optimum shape according to the specifications, for example, a shape in which a gas generation speed changes with time at the time of combustion of the gas generating agent 61 is selected. In addition to the shape of the gas generating agent 61, it is preferable to appropriately select a size and a filling amount of the molded body in consideration of a linear combustion speed, a pressure index, and the like of the gas generating agent 61.

As the filter 90, for example, a binder obtained by winding and sintering a metal wire material such as stainless steel or steel, a binder obtained by pressing a net material by press working with which a metal wire material is interwoven, and the like can be used. As the net material, specifically, a knitted wire mesh, a plain weave wire mesh, an aggregate of crimp weave metal wire materials, and the like can be used.

As the filter 90, a filter obtained by winding a perforated metal plate or the like can also be used. In this case, as the perforated metal plate, for example, an expanded metal obtained by cutting a metal plate in a zigzag manner, expanding the metal plate to form holes, and processing the metal plate into a mesh shape, a hook metal obtained by flattening a metal plate by drilling holes in the metal plate and crushing burrs generated at peripheral edges of the holes at that time, or the like is used. In this case, the size and shape of the holes to be formed can be appropriately changed as necessary, and holes having different sizes and shapes may be included on the same metal plate. As the metal plate, for example, a steel plate (mild steel) or a stainless steel plate can be suitably used, and a non-ferrous metal plate such as aluminum, copper, titanium, nickel, or an alloy thereof can also be used.

The filter 90 functions as a cooling means that cools gas by depriving high temperature heat of the gas when the gas generated in the combustion chamber 60 passes through the filter 90, and also functions as a removal means that removes residues (slag) and the like contained in the gas. Therefore, in order to sufficiently cool the gas and prevent the residue from being released to the outside, it is necessary to ensure that the gas generated in the combustion chamber 60 passes through the filter 90. The filter 90 is disposed apart from the circumferential wall portions 12 and 22 so that a gap 28 having a predetermined size is formed between the circumferential wall portion 12 of the lower shell 10 and the circumferential wall portion 22 of the upper shell 20 constituting the circumferential wall portion of the housing.

A part of the circumferential wall portion 22 of the upper shell 20 facing the filter 90 is provided with a plurality of gas ejection ports 23. The plurality of gas ejection ports 23 is for leading out the gas that has passed through the filter 90 to the outside of the housing.

A metallic seal tape 24 as a seal member is attached to an inner peripheral surface of the circumferential wall portion 22 of the upper shell 20 so as to close the plurality of gas ejection ports 23. As the seal tape 24, an aluminum foil or the like having one surface coated with an adhesive member can be suitably used, and airtightness of the combustion chamber 60 is secured by the seal tape 24.

The lower support member 70 is disposed near an end of the combustion chamber 60, located close to the bottom plate portion 11. The lower support member 70 has an annular shape, and is disposed to be substantially fitted to the filter 90 and the bottom plate portion 11 so as to cover a boundary between the filter 90 and the bottom plate portion 11. As a result, the lower support member 70 is located between the bottom plate portion 11 and the gas generating agent 61 near the above-described end of the combustion chamber 60.

The lower support member 70 includes an annular plate-shaped base portion 71 fitted to the bottom plate portion 11 along an inner bottom surface of the bottom plate portion 11, an abutment portion 72 abutting on an inner peripheral surface of the filter 90 near the bottom plate portion 11, and a cylindrical erected portion 73 erected from the base portion 71 toward the top plate portion 21. The abutment portion 72 extends from an outer edge of the base portion 71, and the erected portion 73 extends from an inner edge of the base portion 71. The erected portion 73 covers an outer peripheral surface of the protruding cylindrical portion 13 of the lower shell 10 and an outer peripheral surface of the inner cover 31 of the holder 30.

The lower support member 70 is a member for fixing the filter 90 to the housing, and also functions as an outflow preventing means for preventing the gas generated in the combustion chamber 60 from flowing out from the gap between a lower end of the filter 90 and the bottom plate portion 11 without passing through the inside of the filter 90 at the time of activation. Therefore, the lower support member 70 is formed by, for example, pressing a plate-like member including metal, and is preferably formed with a member including a steel plate (for example, a cold-rolled steel plate, a stainless steel plate, or the like) such as ordinary steel or special steel.

The upper support member 80 is disposed near an end of the combustion chamber 60, located close to the top plate portion 21. The upper support member 80 has a substantially disk shape, and is disposed to be fitted to the filter 90 and the top plate portion 21 so as to cover a boundary between the filter 90 and the top plate portion 21. As a result, the upper support member 80 is located between the top plate portion 21 and the gas generating agent 61 near the above-described end of the combustion chamber 60.

The upper support member 80 includes a base portion 81 abutting on the top plate portion 21 and an abutment portion 82 erected from a peripheral edge of the base portion 81. The abutment portion 82 abuts on an inner peripheral surface of an axial end of the filter 90 located close to the top plate portion 21.

The upper support member 80 is a member for fixing the filter 90 to the housing, and also functions as an outflow preventing means for preventing the gas generated in the combustion chamber 60 from flowing out from the gap between an upper end of the filter 90 and the top plate portion 21 without passing through the inside of the filter 90 at the time of activation. Therefore, the upper support member 80 is formed by, for example, pressing a plate-like member including metal, and is preferably formed with a member including a steel plate (for example, a cold-rolled steel plate, a stainless steel plate, or the like) such as ordinary steel or special steel.

A disk-shaped cushion material 85 is disposed inside the upper support member 80 so as to be in contact with the gas generating agent 61 accommodated in the combustion chamber 60. As a result, the cushion material 85 is located between the top plate portion 21 and the gas generating agent 61 in a part of the combustion chamber 60 close to the top plate portion 21, and presses the gas generating agent 61 toward the bottom plate portion 11.

The cushion material 85 is provided for the purpose of preventing the gas generating agent 61 formed with a molded body from being pulverized by vibration or the like, and preferably includes a molded body of a ceramic fiber, rock wool, a member containing foamed resin (for example, foamed silicone, foamed polypropylene, foamed polyethylene, foamed urethane, and the like), or rubber or the like typified by chloroprene and EPDM.

Next, a procedure of assembling work of the disk-type gas generator 100 according to the present embodiment will be described with reference to FIG. 1.

First, in the lower shell 10, the igniter 40 is fixed by being injection-molded as the holder 30 including the resin molding portion. Then, the side wall of the cup-shaped member 50 in which the enhance agent 59 is stored is fixed by press-fitting into the holder 30 of the lower shell 10.

Then, the inside of the filter 90 is filled with the gas generating agent 61, and the upper support member 80 with the cushion material 85 interposed is inserted into the upper end of the filter 90. Thereafter, the upper shell 20 in which the gas ejection port 23 is closed by the seal tape 24 is covered with the lower shell 10, and the lower shell 10 and the upper shell 20 are welded. Thus, the assembly of the gas generator 100 having the structure shown in FIG. 1 is completed.

Here, in the disk-type gas generator 100 according to the present embodiment, since the cup-shaped member 50 is not provided with an opening, a step of filling the enhance agent 59 into the enhancer chamber 57 provided inside the cup-shaped member 50 can be performed significantly easily.

This is because the cup-shaped member 50 itself includes a fragile member having low mechanical strength so that a part of the cup-shaped member ruptures, deforms, or melts when the disk-type gas generator 100 is in activation. This configuration eliminates the need for the work of closing the opening provided in the cup-shaped member 50 to fill the enhance agent 59 and, for example, an aluminum tape or a closing plate, which are necessary in the case of using the cup-shaped member having the opening, and thus can significantly simplify a manufacturing process.

Figure 3:
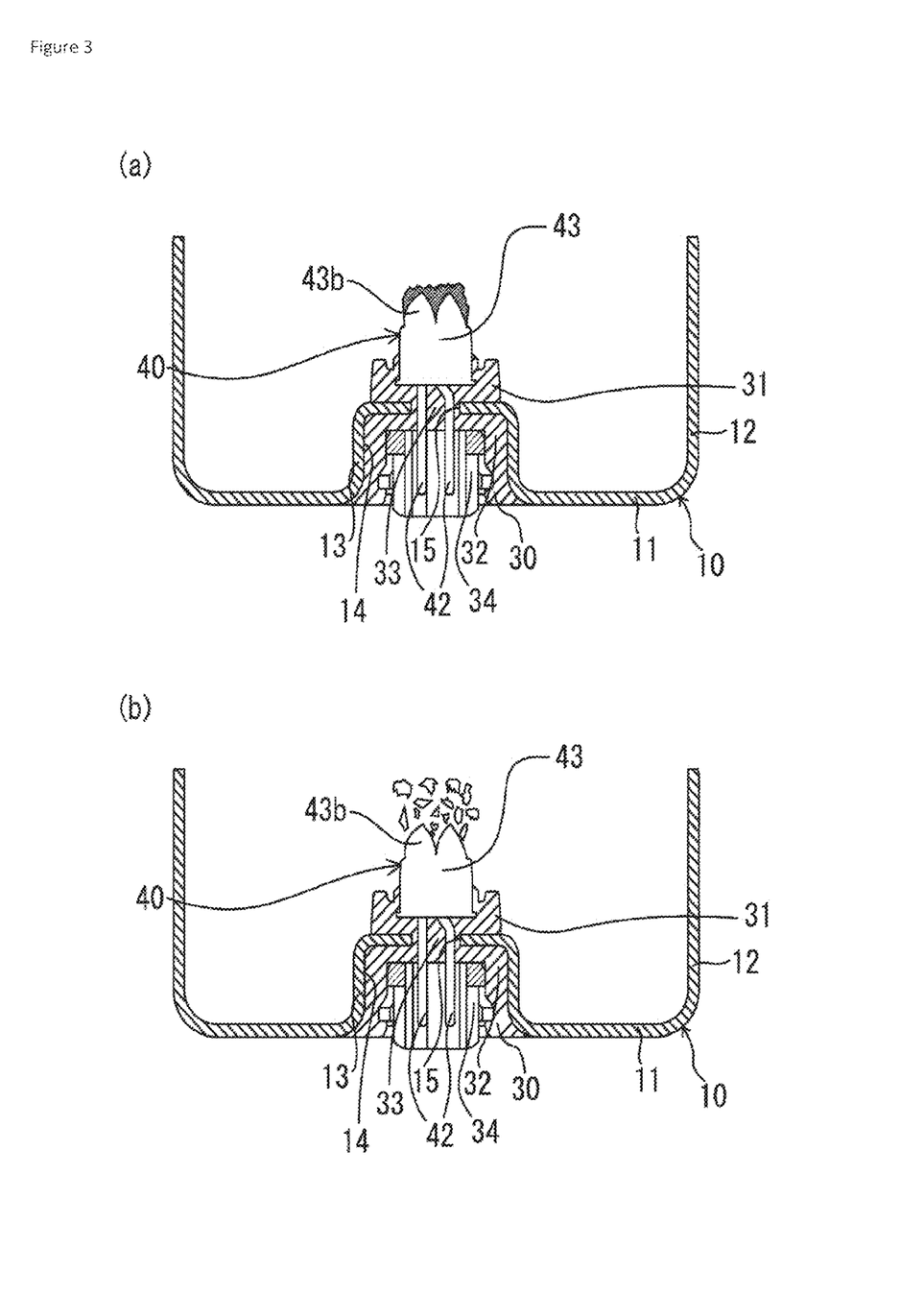
FIG. 3 is a schematic partial sectional view for describing cleavage of a squib cover of the disk-type gas generator of FIG. 1.

FIG. 3 is a schematic sectional view for describing an activation of the disk-type gas generator according to the present embodiment. Next, an activation of the disk-type gas generator 100 according to the present embodiment will be described with reference to FIGS. 1 and 3. Note that FIG. 3 is a schematic sectional view that shows some members around the igniter 40, but does not show the other members for convenience of description.

Referring to FIG. 1, when a vehicle equipped with the disk-type gas generator 100 collides, the collision is detected by a collision detector separately provided in the vehicle, and on the basis of the detection, the igniter 40 is activated by energization from a control unit separately provided in the vehicle. The enhance agent 59 accommodated in a space S1 as an enhancer chamber is ignited by flame generated by the activation of the igniter 40, and starts combustion.

At this time, immediately after the igniter 40 is activated, the ignition charge filled in the ignition portion 41 rapidly combusts to rupture the squib cup of the ignition portion 41 and cleave the squib cover 43 along with the rapture, and a thrust generated by the rapid combustion of the ignition charge is transmitted to the enhance agent 59 filled in the enhancer chamber 57. Here, the cleavage of the squib cover 43 will be specifically described with reference to FIG. 3.

When the igniter 40 is activated, first, a state as shown in FIG. 3(a) is obtained from an initial state of FIG. 1. Specifically, the top of the squib cover 43 expands, the non-weak member 43b swells, and the weak member 43a extends. Next, as shown in FIG. 3(b), the weak member 43a is broken to be in a state of several lumps. That is, the top of the squib cover 43 is cleaved.

Subsequently, when the thrust reaches the inside of the cup-shaped member 50, the cup-shaped member 50 including a relatively fragile member ruptures, deforms, or melts. The rupture, deformation, or melting of the cup-shaped member 50 occurs later than the ignition of the enhance agent 59 by heat particles generated by the combustion of the ignition charge. Here, the enhance agent 59 of the cup-shaped member 50 is scattered and dispersed inside the cup-shaped member 50 by receiving the thrust generated by the combustion of the ignition charge.

Therefore, the enhance agent 59 at a position far from the igniter 40 is also ignited by the heat particles in a shorter time and starts combustion. As a result, a pressure increase in the space inside the cup-shaped member 50 and a temperature increase in the space are greatly promoted.

As a result, the cup-shaped member 50 ruptures, deforms, or melts in a shorter time, and a large amount of heat particles generated by the combustion of the enhance agent 59 flows into the combustion chamber 60 at an early stage.

In particular, in FIG. 1, the cup-shaped member 50, which includes iron or stainless steel and has higher strength than aluminum, does not rupture, deform, or melt at an initial stage of combustion of the enhance agent 59. At this time, the internal pressure of the cup-shaped member 50 increases until a predetermined time elapses during which the cup-shaped member 50 ruptures, deforms, or melts. Then, after the internal pressure reaches a certain level or more, the cup-shaped member 50 ruptures, deforms, or melts. Therefore, by increasing the mechanical strength of the cup-shaped member 50 by using an iron-based metal material having high mechanical strength, such as iron or stainless steel, the combustion of the enhance agent 59 can be sufficiently promoted when the cup-shaped member 50 is cleaved, and the cup-shaped member 50 can be cleaved in a state where the combustion of the gas generating agent 61 is promoted. The mechanical strength of the cup-shaped member 50 can be also improved by increasing the thickness even when a metal having low strength such as aluminum is used. The thickness in that case is preferably 0.4 mm or more and 1.5 mm or less, and more preferably 0.6 mm or more and 1.2 mm or less.

In this way, when a large amount of heat particles flows into the combustion chamber 60, the gas generating agent 61 accommodated in the combustion chamber 60 is ignited and combusts, and a large amount of gas is generated. The gas generated in the combustion chamber 60 passes through the inside of the filter 90, and at that time, heat is deprived by the filter 90 and cooled, and the slag contained in the gas is removed by the filter 90 and flows into the gap 28.

As the pressure in the space inside the housing increases due to the combustion of the gas generating agent 61, the seal tape 24 closing the gas ejection port 23 provided in the upper shell 20 is cleaved, and the gas is ejected to the outside of the housing through the gas ejection port 23. The ejected gas is introduced into an airbag provided adjacent to the disk-type gas generator 100, and inflates and deploys the airbag.

As described above, in the above-described embodiment of the present invention, the top of the squib cover 43 is smoothly broken after activation while maintaining the sealability and insulation in the initial state, and thus fire can be smoothly transferred to the enhance agent 59. Therefore, the combustion of the gas generating agent 61 can be started earlier. As a result, the time from the time point when the igniter 40 is activated to the time point when the gas starts to be ejected to the outside through the gas ejection port 23 can be reduced as compared with the related art. In addition, if the time from the time point when the igniter 40 is activated to the time point when the gas starts to be ejected to the outside through the gas ejection port 23 is set to be the same as that in the related art, the amount of the enhance agent 59 can be reduced by a predetermined amount as compared with the related art by changing the material of the squib cover 43 of the present invention. Accordingly, the cost can be reduced.

In addition, since the amount of resin to be used can be reduced by forming the weak member 43a as a slit-shaped groove, the cost can be reduced as compared with a case where the weak member 43a is not formed.

Hereinafter, modifications of the embodiment of the present invention will be described. The same names and reference signs with the same last two digits are used for portions having similar functions unless otherwise specified. The description of portions similar to the above embodiment may be omitted.

Figure 4:
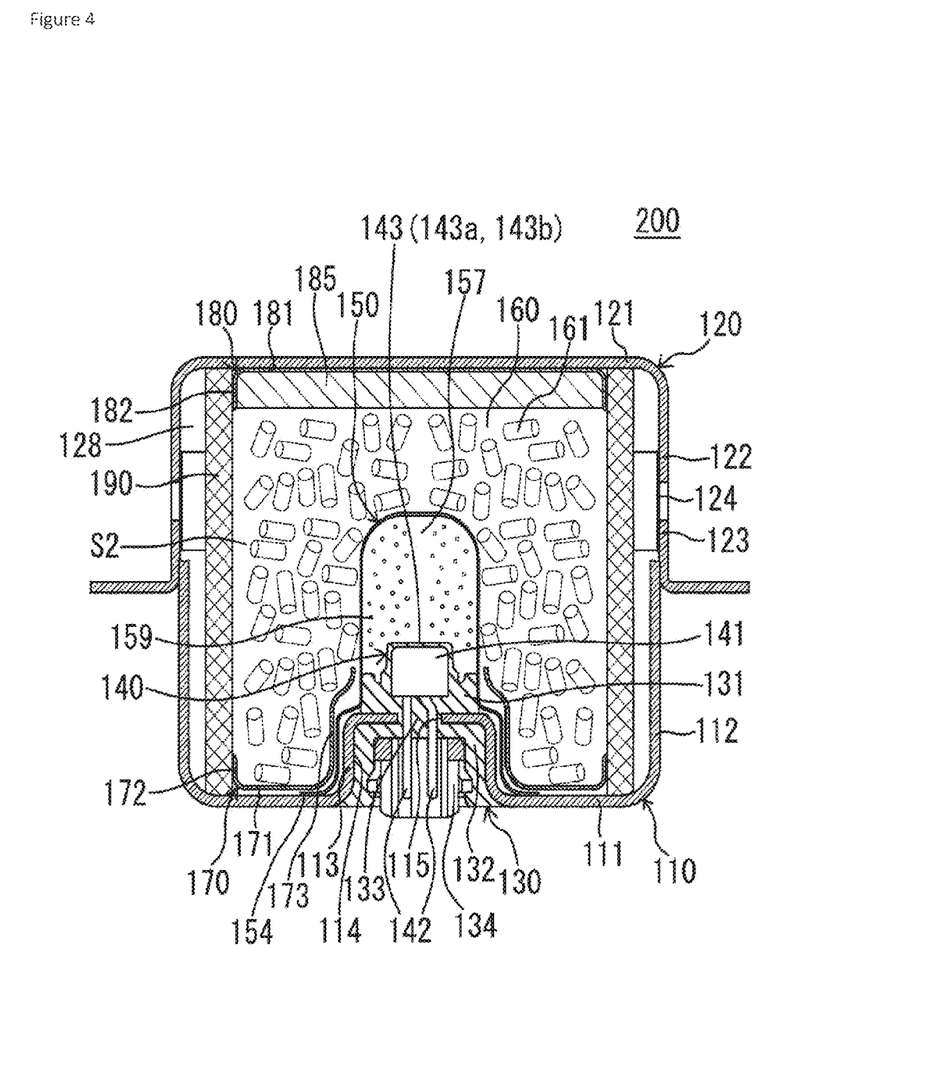
FIG. 4 is a schematic sectional view illustrating a modification of the disk-type gas generator of FIG. 1.

For example, as shown in FIG. 4, the gas generator may be a gas generator 200 including an igniter 140 in which a squib cover and a holder are integrated. In the present modification, not only effects similar to those of the embodiment can be obtained, but also the sealability can be further improved and the number of components can be reduced. In addition, since there is no step of attaching a squib cover, the cost can be reduced accordingly.

The igniter according to the embodiment and the modifications of the present invention is applicable to, for example, a disk-type gas generator provided with two igniters called dual inflators similarly to the disk-type gas generator 100 according to the present embodiment. The present invention is also applicable to an igniter of a so-called cylinder-type gas generator having a long cylindrical outer shape, and is also applicable to an igniter of a small gas generator provided in a pretensioner of a seat belt.

The squib cover 43 is not limited to the squib cover 43 shown in FIG. 1. For example, as long as the slits constituting the weak member 43a are radially provided, any number of slits may be used. For example, the weak member may be provided with slits in a cross shape or an asterisk shape in plan view. In addition, the top of the squib cover 43 may include a flat surface on which the weak member 43a is not formed.

The uneven shape of the weak member 43a is not limited to the above-described shape, and may be any shape. For example, a part of the non-weak member 43b may bulge toward a side to form the weak member 43a, or the entire weak member 43a may be curved so as to form a concave portion. In addition, a plurality of convex portions or concave portions may be provided in the weak member 43a in a point sequence shape or a matrix shape.

In the embodiment of the present invention and the modifications of the embodiment, the case where the protruding cylindrical portion is provided in the lower shell has been exemplified, but the present invention is naturally applicable to a gas generator having a configuration in which the protruding cylindrical portion is not provided.

In addition, the characteristic configurations described in the embodiment of the present invention and the modifications of the embodiment can be naturally combined with each other within an allowable range in light of the gist of the present invention.

As described above, the embodiment and the modifications of the embodiment disclosed herein are illustrative in all respects and are not restrictive. The technical scope of the present invention is defined by the claims, and includes meanings equivalent to the claims and all changes within the scope of the claims.

(Verification test) Next, disk-type gas generators (hereinafter, sequentially referred to as a gas generator of Example 1 and a gas generator of Example 2) having the same configuration as the disk-type gas generators 100 and 200 described above were prepared, and a verification test was conducted on what kind of change occurs in a 60 L tank test by changing the material of the squib cover and integrating the squib cover and the holder. Here, the 60 L tank test is a test in which temperatures of the disk-type gas generators having the same configuration as the disk-type gas generators 100 and 200 are adjusted in an environment of −40° C.±2° C. for four hours or more, and then the disk-type gas generators are each individually installed in a 60 L volume sealed tank, and an increase in internal pressure of the tank is measured over time by activating the disk-type gas generators. In the verification test, a gas pressure from a time point when an igniter was activated to 100 ms was measured over time. The number of moles of the gas generated by a gas generating agent in each disk-type gas generator is 2 mol, and a filling amount of an enhance agent into the cup-shaped member is 1.2 g. In the verification test, the material of the squib cover of the gas generator of Example 1 was nylon 66 containing 30 wt % of glass fiber, and the material of the portion where the squib cover and the holder were integrated in the gas generator of Example 2 was nylon 66 containing 30 wt % of glass fiber. The material of the squib cover of the conventional gas generator in Example 1 (which has the same configuration as the gas generator of Example 1 except that the material of the squib cover is different) was nylon 66, and the material of the portion where the squib cover and the holder of the conventional gas generator in Example 2 (which has the same configuration as the gas generator of Example 2 except that the material of the portion where the squib cover and the holder are integrated is different) were integrated was also nylon 66. The elongation percentage of nylon 66 of the squib cover used for the conventional gas generator was 10%. In addition, the elongation percentage of nylon 66 containing 30 wt % of glass fiber and used for the squib covers (product with changed material) of Examples 1 and 2 according to the present invention was 3%.

Results of Example 1

Figure 5:
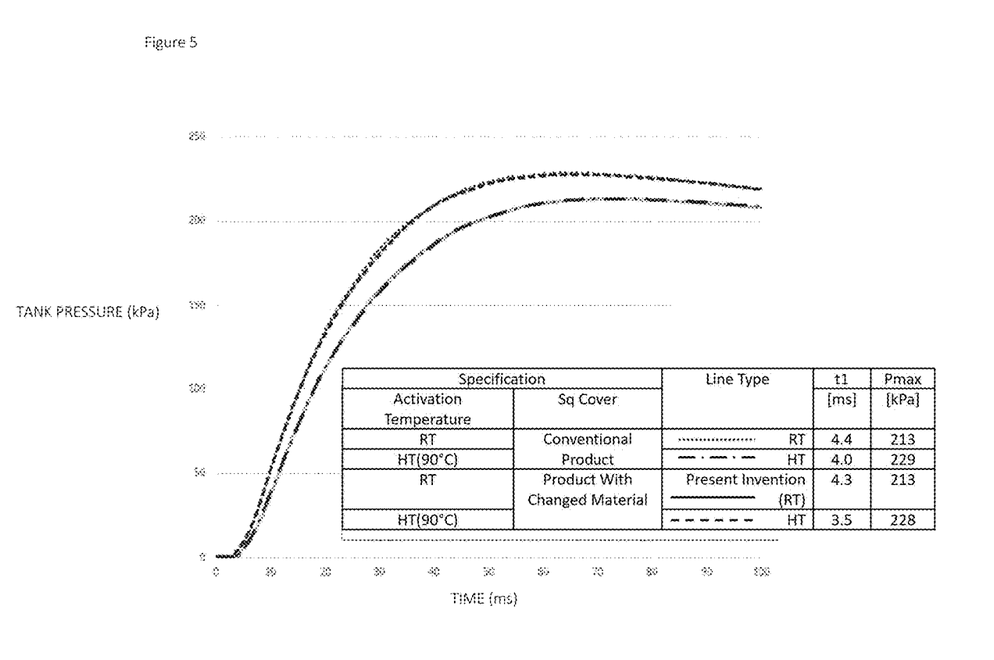
FIG. 5 is a graph showing results of Example 1 in a verification test.

FIG. 5 shows results of Example 1. Here, HT is a test in an environment of 90° C., and RT is a test in an environment of room temperature. "SQ cover" in FIG. 5 is an abbreviation of a squib cover. The same applies to Example 2. From the graph of FIG. 5, it has been found that time t1 from the time point when the igniter is activated until the gas pressure starts to increase in the gas generator of Example 1 is faster than that in the conventional gas generator.

Results of Example 2

Figure 6:
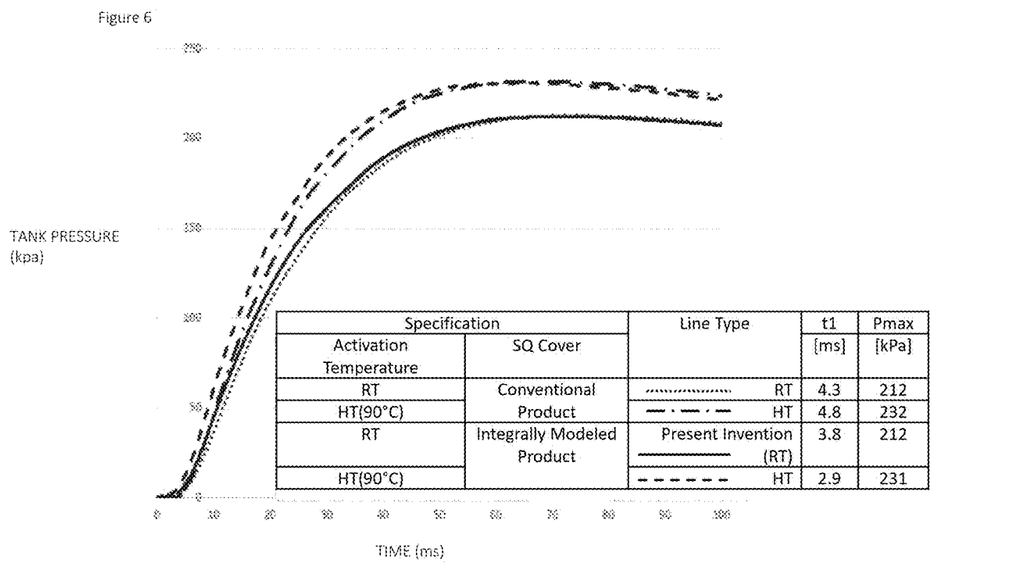
FIG. 6 is a graph showing results of Example 2 in the verification test.

FIG. 6 shows results of Example 2. From the graph of FIG. 6, it has been found that time t1 from the time point when the igniter is activated until the gas pressure starts to increase in the gas generator of Example 2 is faster than that in the conventional gas generator.

From the results of Examples 1 and 2, it has been found that, in the case of the gas generator using the squib cover of the present invention for the igniter, time t1 from the time point when the igniter is activated until the gas pressure starts to increase can be reduced by setting the elongation percentage of the material constituting the squib cover to be lower than that of the conventional gas generator. That is, it has been found that an output performance of the gas generator using the squib cover of the present invention for the igniter is better than that of the conventional gas generator.

REFERENCE SIGNS LIST 10, 110 lower shell
11, 111 bottom plate portion
12, 112 circumferential wall portion
13, 113 protruding cylindrical portion
14, 114 recess
15, 115 opening
20, 120 upper shell
21, 121 top plate portion
22, 122 circumferential wall portion
23, 123 gas ejection port
24, 124 seal tape
28, 128 gap
30, 130 holder
31, 131 inner cover
32, 132 outer cover
33, 133 coupling portion
34, 134 female connector
40, 140 igniter 41, 141 ignition portion
42, 142 terminal pin
43, 143 squib cover
43a, 143a weak member
43b, 143b non-weak member
50, 150 cup-shaped member
54, 154 distal end
57, 157 enhancer chamber
59, 159 enhance agent
60, 160 combustion chamber
61, 161 gas generating agent
70, 170 lower support member
71, 171 base portion
72, 172 abutment portion
73, 173 erected portion
80, 180 upper support member
81, 181 base portion
82, 182 abutment portion
85, 185 cushion material
90, 190 filter
100, 200 gas generator
S1, S2 space

The invention claimed is:

1. An igniter comprising:
a first cup-shaped member that has a bottomed cylindrical shape, internally includes an ignition charge, and has an opening fitted by a plug having a pair of electrode pins to which a resistor is connected;
a second cup-shaped member that has a bottomed cylindrical shape and covers an outside of the first cup-shaped member; and
a holder that integrally holds the pair of electrode pins, the plug, the first cup-shaped member, and the second cup-shaped member,
wherein the second cup-shaped member includes a thermosetting resin or a thermoplastic resin including an elongation percentage adjusting material that adjusts an elongation percentage after molding to less than 10%.

2. The igniter according to claim 1, wherein the second cup-shaped member and the holder are integrally molded, and the second cup-shaped member includes a same material as the holder.

3. A gas generator comprising the igniter according to claim 1.

* * * * *